United States Patent [19]

Iwamoto et al.

[11] Patent Number: 5,003,956
[45] Date of Patent: Apr. 2, 1991

[54] ELECTRONIC FUEL INJECTION CONTROL SYSTEM FOR A MULTI-FUEL INTERNAL COMBUSTION ENGINE AND METHOD THEREFORE

[75] Inventors: Akio Iwamoto; Yoshiki Yuzuriha, both of Gunma, Japan

[73] Assignee: Japan Electronic Control Systems Co., Ltd., Isezaki, Japan

[21] Appl. No.: 507,845

[22] Filed: Apr. 12, 1990

[51] Int. Cl.$^5$ .......................................... F02M 51/00
[52] U.S. Cl. .................................. 123/494; 123/1 A; 123/575
[58] Field of Search .............. 123/494, 1 R, 1 A, 304, 123/575

[56] References Cited

U.S. PATENT DOCUMENTS

| | | | |
|---|---|---|---|
| 4,905,655 | 3/1990 | Maekawa | 123/494 |
| 4,909,225 | 3/1990 | Gonze et al. | 124/494 |
| 4,913,099 | 4/1990 | Oda | 123/1 A |
| 4,945,880 | 8/1990 | Gonze et al. | 123/575 |
| 4,949,695 | 8/1990 | Uranishi et al. | 123/494 |

Primary Examiner—Raymond A. Nelli
Attorney, Agent, or Firm—Foley & Lardner, Schwartz, Jeffery, Schwaab, Mack, Blumenthal & Evans

[57] ABSTRACT

In a multi-fuel engine which is operated on gasoline, alcohol or a mixture of the two, upon an alcohol sensor being diagnosed as being out of order, an alcohol correction factor in the injection pulse width calculation is clamped at an arbitrary value and in the case of high load operation a carburetion correction factor is incrementally increased instead of being set to a prerecorded value for the instant load.

2 Claims, 5 Drawing Sheets

ELECTRONIC FUEL INJECTION CONTROL SYSTEM FOR A MULTI-FUEL INTERNAL COMBUSTION ENGINE AND METHOD THEREFORE

BACKGROUND OF THE INVENTION

1. Field of the Invention

The present invention relates generally to fuel injection systems and more specifically to fuel injection systems for engine which are adapted to run different fuels or a mixture of different fuels.

2. Description of the Prior Art

In commonly used fuel injection systems the basic fuel injection pulse width is determined by sensing the amount of air Q being induced into the engine (i.e. engine load) and the engine speed N, and using this data in the following equation:

$$Tp = K \times Q/N \quad (1)$$

where K is a constant

After having obtained the basic fuel injection pulse width Tp, a final injection pulse width Ti is derived by applying a correction factor COEF which takes various driving conditions into account. Viz.:

$$Ti = 2 \times (Tp \times COEF \times \alpha) + Ts \quad (2)$$

where $\alpha$ is a air-fuel ratio feedback correction coefficient, and Ts is a correction factor which takes the rise time of the fuel injectors into account. An example of such a concept is disclosed in JU-A-62-162364.

COEF is a derived by summing a plurality of individual correction values. Viz.:

$$COEF = 1 + KMR + KTW + KAS + Kfuel - Kdc \quad (3)$$

where:

KMR is carburettion ratio correction factor based on the engine speed and the basic engine pulse width—Under high engine load or speed, the value assumes a large value;

KTW is correction factor which varies with the engine coolant temperature;

KAS is an engine cranking and initial engine starting correction factor which varies with the engine coolant temperature at the time the engine switch is closed and the ignition key is turned to the ON position;

Kfuel is an acceleration correction factor which varies with the amount of change in the throttle valve position; and KDC is a low speed low amount correction factor.

JP-A-56-98540 discloses a fuel injection arrangement is adapted to permit the fuel which is supplied to the engine is switched from gasoline to alcohol or the engine is operated on a mixture of alcohol and gasoline.

This system includes a alcohol sensor which detects the amount of alcohol which is present in the fuel being supplied to the fuel injectors of the engine. In this case the final injection pulse width is calculated using the following equation:

$$Ti = 2 \times (Tp \times COEF \times KMET \times \alpha) + Ts \quad (4)$$

wherein KMET is a correction factor which varies with the amount of alcohol detected in the fuel. In this instance the value of KMET varies in the manner shown in FIG. 5.

However, this system has suffered from the drawback that in the event that the alcohol sensor malfunctions, the erroneous alcohol content indication adversely effects the fuel injection pulse width.

When the engine is operating in a power zone at high speed or under high load the value of KMR has been increased to a large value in order to obtain the required power output. However, if the value of KMR should be arbitrarily increased due to sensor malfunction, when the vehicle is not operating under high speed/load conditions, the value of Ti becomes abnormally high and too much fuel is injected into the engine. This results in the air-fuel ratio becoming excessively rich and gives rise to a loss in fuel economy and emission control. In the worst case the loss of air-fuel ratio control can lead to engine stalling and the like.

SUMMARY OF THE INVENTION

It is an object of the present invention to provide a control arrangement of the nature described above but in which, in the event of an alcohol sensor malfunction, suitable correction of the injection amount can be carried out to the degree that engine stoppage and excessive noxious emissions can be prevented.

In brief, the above object is achieved by an arrangement wherein upon an alcohol sensor being diagnosed as being out of order, an alcohol correction factor in the injection pulse width calculation is clamped at an arbitrary value and in the case of high load operation a carburettion correction factor is incrementally increased instead of being set to a prerecorded value for the instant load.

More specifically, a first aspect of the present invention is deemed to comprise an internal combustion engine which features: means for determining the load on the engine; means for determining the engine speed, means for sensing the content of the fuel being supplied to the engine; diagnostic means for monitoring the operation of fuel content sensing means and for indicating the fuel content sensing means is malfunctioning when the output characteristics vary in a predetermined manner; means for determining a basic fuel supply amount based on the engine load and engine speed; means deriving an actual fuel supply amount by correcting the basic fuel amount using a first correction factor based on the sensed content of the fuel and a second correction factor based on the load on the engine, the second correction factor being arranged to be set to a relatively high value when the load on the engine is above a predetermined level and the diagnostic means indicates that the fuel content sensing means is operating normally; means for setting the first correction factor to a predetermined value upon the diagnostic means indicating the fuel content sensing means is malfunctioning; and means for incrementally increasing the second second correction factor in lieu of setting the second correction factor to the relatively high value when the diagnostic means indicates that the fuel content sensing means is malfunctioning.

A second aspect of the present invention is deemed to comprise a method of operating an internal combustion engine which features the steps of: sensing engine load; sensing engine speed; sensing the content of the fuel being supplied to the engine using a fuel content sensor; monitoring the operation of fuel content sensor and for indicating the fuel content sensor is malfunctioning when the output characteristics vary in a predetermined manner; determining a basic fuel supply amount based on the engine load and engine speed; deriving an actual fuel supply amount by correcting the basic fuel amount using a first correction factor based on the sensed content of the fuel and a second correction factor based on the load on the engine, the second correction factor being arranged to be set to a relatively high value when the load on the engine is above a predetermined level and the fuel content sensor is operating normally; setting the first correction factor to a predetermined value upon the fuel content sensor being indicated as malfunctioning; and incrementally increasing the second second correction factor in lieu of setting it to the relatively high value, when the fuel content sensor is indicated as malfunctioning.

DESCRIPTION OF THE PREFERRED EMBODIMENTS

Figure 1:
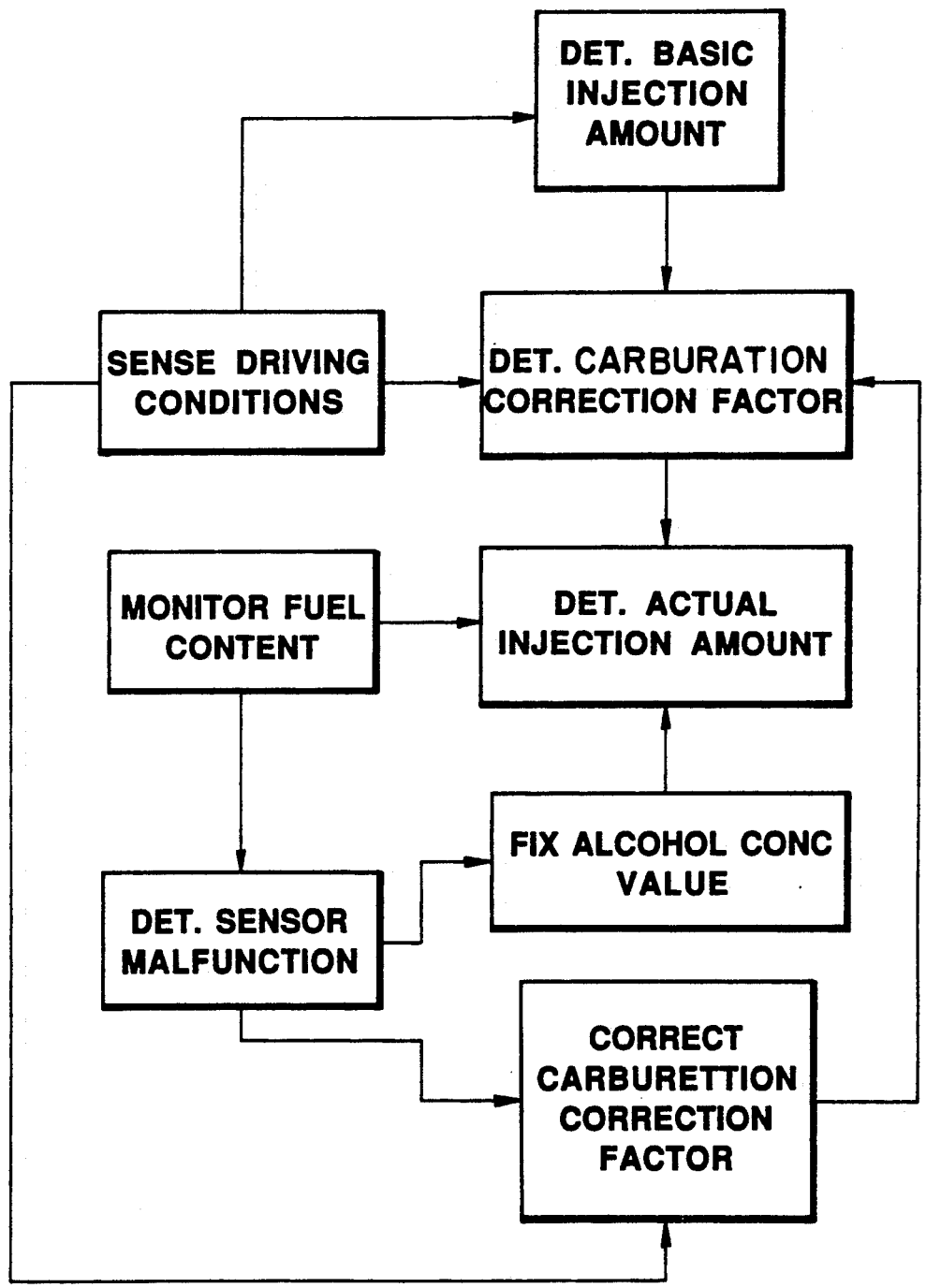
FIG. 1 is a schematic block diagram which demonstrates the concept upon which the instant invention is based.
Figure 2:
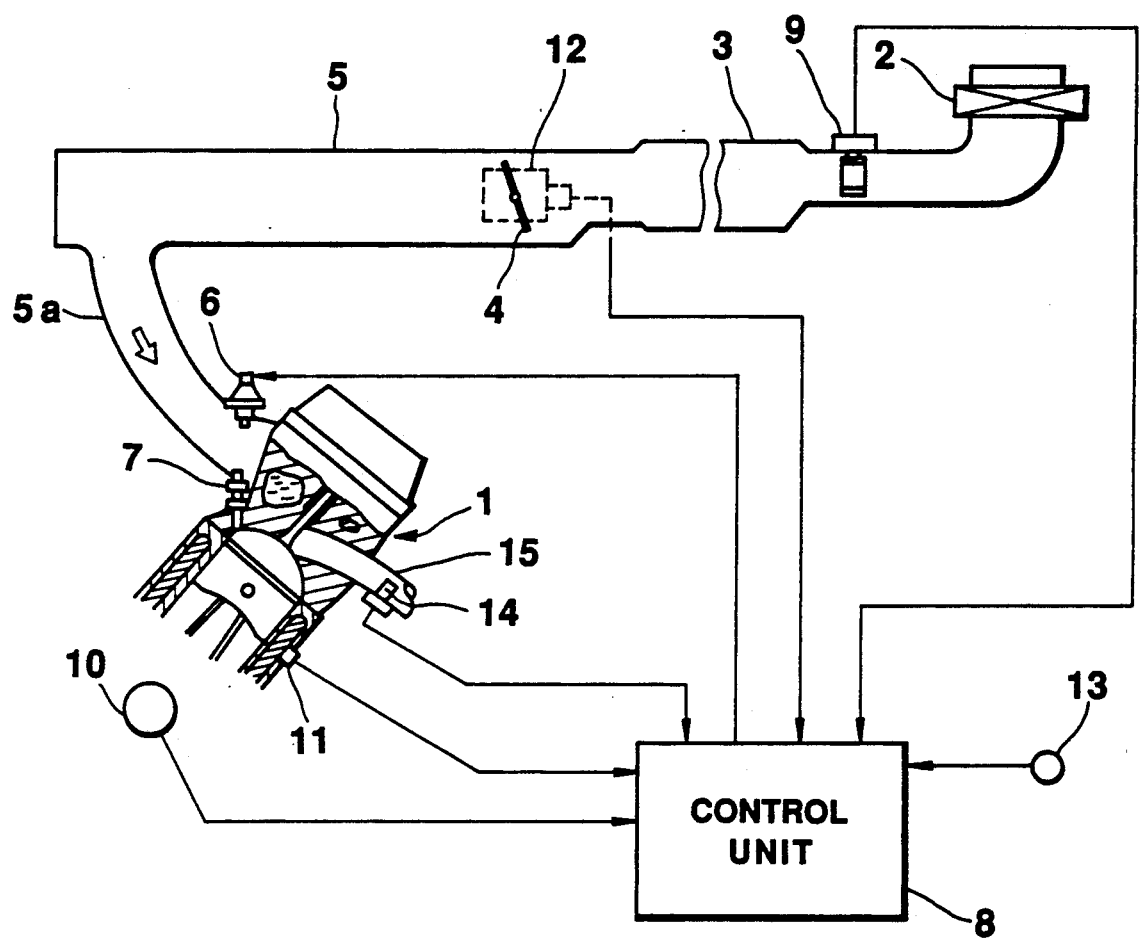
FIG. 2 is a schematic representation of an engine system of the nature to which an embodiment of the instant invention can be applied.

FIG. 1 shows an engine system to which an embodiment of the present invention is applied. In this system air which is filtered by an air cleaner 2 flows through an air duct 3 via a throttle chamber 4 into an induction manifold 5. The manifold 5 includes a number of branch runners 5a which lead to the cylinders of the engine. Fuel injectors 6 are arranged in the branch runners 5a. In this instance these injectors are of the type which are solenoid operated and supplied with energizing pulse signals from a control unit 8. Although not illustrated it will be understood that these injectors are supplied with fuel under constant pressure from a pump and fuel distribution network which includes a pressure regulator.

It should be noted that the present invention is not limited to the use of illustrated multi-point injection (MPI) arrangements and can be applied to an engine having a single point SPI type injector which is located downstream of and in close proximity of the throttle chamber 4.

Spark plugs 7 are used to ignite the air-fuel charge in the combustion chamber of the engine. The timing with which the plugs are energized is controlled by a non illustrated arrangement which is included in the control unit 8.

In this case the control unit includes a microprocessor having a CPU. RAM, ROM A/D converter, input/output interfaces. Data is fed to the microprocessor from a plurality of sensors which include air flow meter 9 disposed in the air duct 3, a crank angle sensor 10, and a coolant temperature sensor 11. In this case the air-flow meter takes the form of a hot wire type air-flow sensor and is arranged to output a signal Q indicative of the amount of air being inducted into the engine. In the case of a 4 cylinder engine, the crank angle sensor is arranged to output a basic pulse each 180° and a train of pulses at 2° intervals. By detecting the number of pulses generated per unit time, it is possible to derive the engine speed in the microprocessor.

The microprocessor also receives an engine load indicative signal from a throttle position sensor 12 which detects the opening degree of the throttle valve which is operatively disposed in the throttle chamber 4, and outputs a TVO signal.

An alcohol sensor 13 is arranged in suitable location in the fuel supply circuit and arranged to output a signal which varies with the amount of alcohol which is contained in the fuel which is being supplied to the engine.

An oxygen sensor 14 is disposed in the exhaust system 15 and arranged to output a signal indicative of the air-fuel ratio of the air-fuel mixture being combusted in the engine.

The ROM of the microprocessor contains a number of control programs including a program for determining the pulse width of the signal which is applied to the fuel injectors 7.

In this case the actual injection pulse width is calculated using equation (4) Viz., $$Ti = 2 \times (Tp \times COEF \times KMET \times \alpha) + Ts$$

Figure 5:
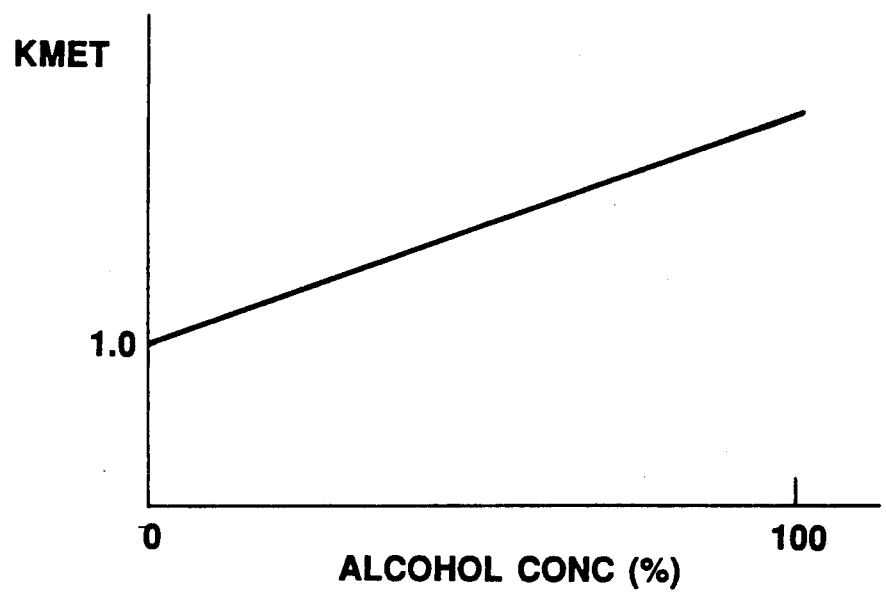
FIG. 5 is graph which shows the manner in which the KMET correction value varies with the amount of alcohol sensed in the fuel being supplied to the engine.

As per the above discussion, the value of KMET varies in the manner shown in FIG. 5. Viz., the value of KMET increase from 1.0 proportionally with the amount of alcohol which is detected as being present in the fuel being supplied to the engine by sensor 13.

Figure 3:
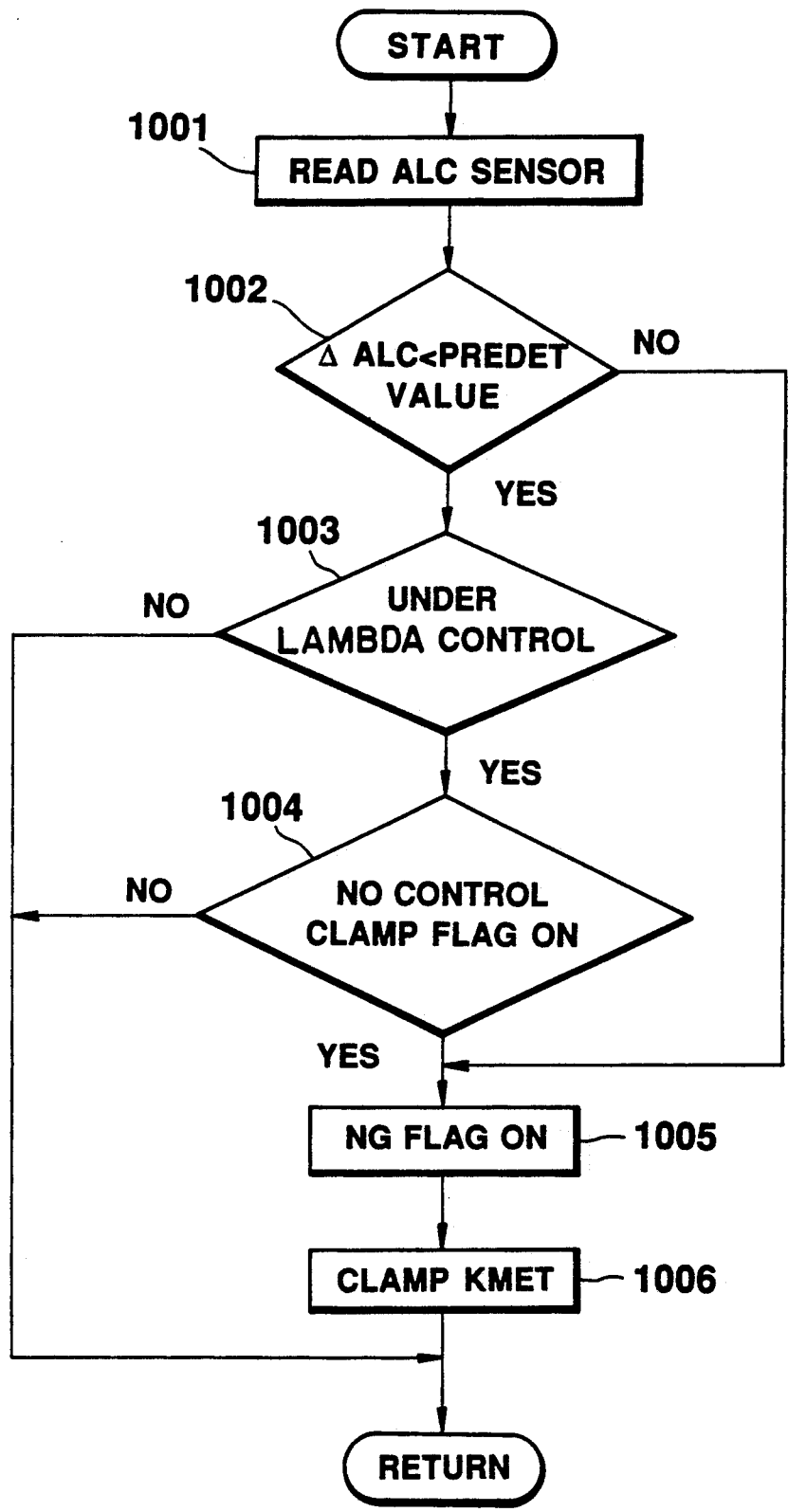
FIG. 3 is a flow chart showing the steps which characterize a routine which diagnoses an alcohol sensor malfunction.

FIG. 3 shows in flow chart form the steps which characterize an alcohol sensor diagnostic program which determines if the sensor is malfunctioning or not.

Step 1001 of this routine is such as to read in an A/D converted output of alcohol sensor 13. At step 1002 the instant value is compared with the value recorded on the previous run of the instant routine and the difference if any, derived. The difference is then compared with a predetermined value.

In the event that the comparison indicates that the fluctuation in the sensor output is greater than the just mentioned value, the routine flows directly to step 1005 wherein a NG flag indicative of a sensor malfunction, is set. That is to say, if the output of alcohol sensor 13 is extremely erratic, it is deemed that the sensor has malfunctioned.

On the other hand, if step 1002 is such as to indicate that the change in the output of the sensor is within an acceptable range, the routine flows to step 1003 wherein the output of the O₂ sensor is used to determine if the air-fuel ratio of the mixture being combusted in the combustion chambers of the engine is within a predetermined range or not. That is to say, if the output of the O₂ sensor is such as to indicate that the air-fuel ratio is above or below the upper and lower limits of a preferred air-fuel ratio range (i.e. the mixture is either too rich or too lean) and control is being effected to bring the A/F back into the desired range, is is assumed that the amount of fuel being supplied to the combustion chambers is either too great or too little and that it is possible that the output of the alcohol sensor 13 is not reliable.

Following this decision, the routine flows to step 1004 wherein the instant status of a "No Control" flag indicative that the air-fuel ratio has gone out of control, is checked. This flag is set by a separate routine which samples the value of the air-fuel ratio feed back control factor to determine if it has reached either a maximum or minimum value. In other words if either of the limits have been reached it is assumed that the value of œ is not correct and that this has possibly resulted from an erroneous alcohol content indication by sensor 13. As a result the air-fuel ratio is clamped to prevent further deviation in an inappropriate direction.

If the above mentioned "No Control" flag has been set then the routine flows to step 1005 to set the NG flag and the goes to step 1006 wherein the value of KMET is clamped at an arbitrary predetermined value of 50%.

Figure 4:
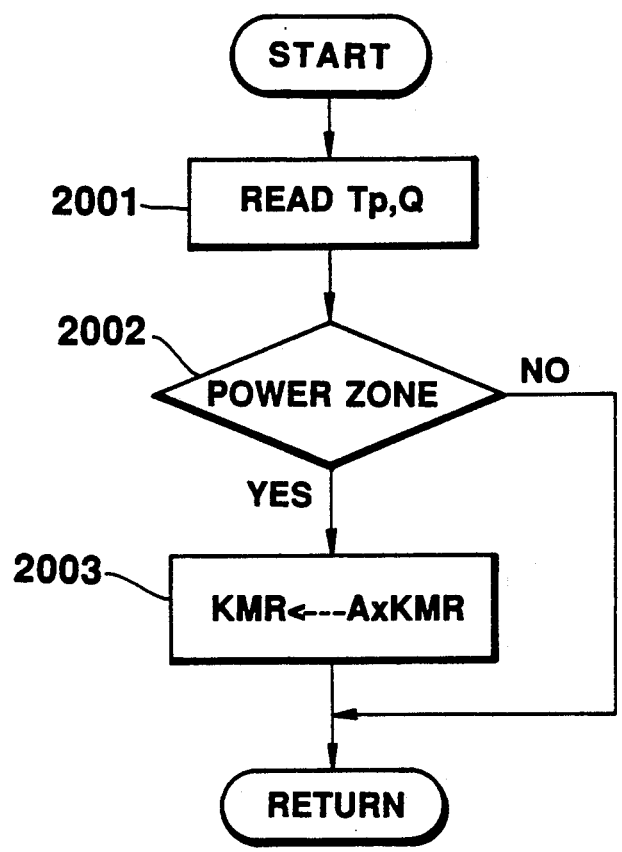
FIG. 4 is a flow chart showing the steps which characterize a routine via which the air fuel ratio correction factor is calibrated in the event of an alcohol sensor malfunction.

FIG. 4 shows the steps which characterize a routine which is run when the engine is operating under a load which is greater than a predetermined value and feedback control of the air-fuel ratio has been lost. Under normal conditions the value of KMR would be increased in response to the high load, however in the event that the alcohol sensor 13 has been diagnosed as malfunctioning such a procedure is stopped and the instant routine is run.

At step 2001 the instant values of Q and basic injection pulse width Tp are read. At step 2002 this data is used in connection with map data stored in the ROM to determine of the engine is operating a power zone or not. If the outcome of this enquiry is such as indicated that the engine is not operating in a power zone the routine by-passes step 2003 and returns. However, on the other hand, if the look-up indicates that the coordinate of the Tp and Q values falls in a mapped power zone, the routine flows to step 2003 wherein the KMR value is corrected with a value A wherein A is such that $0 < A < 1$.

Accordingly, under high load operations when the alcohol sensor is indicated as having malfunctioned, the value of KMET is clamped and the value of KMR is corrected in small incremental steps. This prevents the value of Ti from being suddenly increased to a predetermined large value and obviates the sudden formation of a very rich mixture under such circumstances. This fuel saving control is such as to be prevent abnormally large amount of noxious emissions and prevent engine stalling.

What is claimed is:

1. In an internal combustion engine
   means for determining the load on the engine;
   means for determining the engine speed;
   means for sensing the content of the fuel being supplied to the engine;
   diagnostic means for monitoring the operation of fuel content sensing means and for indicating the fuel content sensing means is malfunctioning when the output characteristics vary in a predetermined manner;
   means for determining a basic fuel supply amount based on the engine load and engine speed;
   means deriving an actual fuel supply amount by correcting the basic fuel amount using a first correction factor based on the sensed content of the fuel and a second correction factor based on the load on the engine, the second correction factor being arranged to be set to a relatively high value when the load on the engine is above a predetermined level and said diagnostic means indicates that the fuel content sensing means is operating normally;
   means for setting said first correction factor to a predetermined value upon said diagnostic means indicating said fuel content sensing means is malfunctioning; and
   means for incrementally increasing said second second correction factor in lieu of setting said second correction factor to the relatively high value when said diagnostic means indicates that said fuel content sensing means is malfunctioning.

2. In a method of operating an internal combustion engine, the steps comprising:
   sensing engine load;
   sensing engine speed;
   sensing the content of the fuel being supplied to the engine using a fuel content sensor;
   monitoring the operation of fuel content sensor and for indicating the fuel content sensor is malfunctioning when the output characteristics vary in a predetermined manner;
   determining a basic fuel supply amount based on the engine load and engine speed;
   deriving an actual fuel supply amount by correcting the basic fuel amount using a first correction factor based on the sensed content of the fuel and a second correction factor based on the load on the engine, the second correction factor being arranged to be set to a relatively high value when the load on the engine is above a predetermined level and the fuel content sensor is operating normally;
   setting said first correction factor to a predetermined value upon said fuel content sensor being indicated as malfunctioning; and
   incrementally increasing said second second correction factor in lieu of setting it to the relatively high value, when said fuel content sensor is indicated as malfunctioning.

* * * * *